United States Patent
Zhang et al.

(10) Patent No.: US 8,934,430 B2
(45) Date of Patent: Jan. 13, 2015

(54) METHOD OF NOTIFYING RESOURCE ALLOCATION FOR DEMODULATION REFERENCE SIGNALS

(75) Inventors: Yingyu Zhang, Shanghai (CN); Renmao Liu, Shanghai (CN); Ming Ding, Shanghai (CN); Yongming Liang, Shanghai (CN); Zeng Yang, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 28 days.

(21) Appl. No.: 13/500,596

(22) PCT Filed: Oct. 28, 2010

(86) PCT No.: PCT/JP2010/069646
§ 371 (c)(1),
(2), (4) Date: Apr. 5, 2012

(87) PCT Pub. No.: WO2011/062066
PCT Pub. Date: May 26, 2011

(65) Prior Publication Data
US 2012/0207119 A1 Aug. 16, 2012

(30) Foreign Application Priority Data

Nov. 20, 2009 (CN) .......................... 2009 1 0226431

(51) Int. Cl.
*H04W 4/00* (2009.01)
*H04L 5/00* (2006.01)
(52) U.S. Cl.
CPC ............ *H04L 5/0023* (2013.01); *H04L 5/0048* (2013.01)
USPC ............................. 370/329; 455/450; 370/437
(58) Field of Classification Search
CPC ........... H04B 17/00; H04B 1/38; H04J 11/00; H04W 72/06; H04W 72/04; H04W 4/20; H04W 40/00
USPC .......................... 375/224, 219, 295, 260, 150; 370/328–330, 335, 337, 203, 241, 252, 370/498, 522, 528, 437; 455/450
See application file for complete search history.

(56) References Cited

U.S. PATENT DOCUMENTS 8,289,935 B2 * 10/2012 Frederiksen et al. .......... 370/337
2009/0175233 A1 * 7/2009 Ojala et al. .................... 370/329

(Continued)

OTHER PUBLICATIONS

Catt, "Discussion on Power Boosting of DMRS", 3GPP TSG RAN WG1 Meeting #58bis, Miyazaki, Japan, Oct. 12, 2009, R1-094135, 5 pages. <URL:http://www.3gpp.org/ftp/tsg_ran/WG1_RL1/TSGR1_58b/Docs/R1-094135.zip>.

(Continued)

*Primary Examiner* — Bob Phunkulh
*Assistant Examiner* — Wali Butt
(74) *Attorney, Agent, or Firm* — Birch, Stewart, Kolasch & Birch, LLP

(57) ABSTRACT

A method of notifying resource allocation for Demodulation Reference Signal (DMRS) is provided. A base station notifies to a user equipment a power offset value between an average EPRE value for data symbols and an average EPRE value for the DMRS at each layer in a semi-static or static manner. Also, the base station dynamically notifies to the user equipment a current channel rank or a current DMRS distribution pattern for the user equipment. The user equipment determines an allocated DMRS antenna port based on a correspondence between the received channel rank and an allocation of DMRS antenna port, thereby obtaining resource allocation information for the DMRS. The signaling overhead for power allocation in the system can be reduced, the efficiency of power amplifier can be improved and the flexibility of system scheduling can be increased. A method of notifying antenna port resource allocation for DMRS is also provided.

20 Claims, 13 Drawing Sheets

(56) References Cited

U.S. PATENT DOCUMENTS

| | | | |
|---|---|---|---|
| 2010/0034174 A1* | 2/2010 | Nishikawa et al. | 370/335 |
| 2010/0080154 A1* | 4/2010 | Noh et al. | 370/310 |
| 2010/0238824 A1* | 9/2010 | Farajidana et al. | 370/252 |
| 2011/0142107 A1* | 6/2011 | Pan et al. | 375/219 |
| 2012/0020323 A1* | 1/2012 | Noh et al. | 370/330 |
| 2012/0224555 A1* | 9/2012 | Lee et al. | 370/329 |

OTHER PUBLICATIONS

Alcatel-Lucent et al., "Transparent vs. non-transparent MU-MIMO", 3GPP TSG RAN WG1 Meeting #59, Tdoc R1-094611, Nov. 9-13, 2009, 2 pages provided.

"3rd Generation Partnership Project;Technical Specification Group Radio Access Network", 3GPP 36.211, V8.8.0, Sep. 2009, pp. 1-83.

"3rd Generation Partnership Project;Technical Specification Group Radio Access Network", 3GPP TS36.213 v8.8.0, Sep. 2009, pp. 1-77.

Huawei, "DMRS design considerations for LTE-A", 3GPP TSG RAN WG1 meeting #58 R1-093030, pp. 1-8, Aug. 24, 2009, pp. 1-8.

NEC Group, "Downlink control signalling support for SU/MU-MIMO", 3GPP TSG-RAN WG1 Meeting #59 R1-094730, pp. 1-7, Nov. 9, 2009, pp. 1-7.

ZTE, Consideration on Downlink Signalling for MU-MIMO, TSG-RAN WG1 #59 R1-095006, pp. 1-6, Nov. 9, 2009, pp. 1-6.

Panasonic, "Joint Consideration of DL DM-RS Design and Codeword-layer Mapping for Rank Over 3", 3GPP TSG RAN WG1 Meeting #58b, Miyazaki, Japan, Oct. 12-16, 2009, R1-093945, pp. 1-5.

* cited by examiner

DMRS

DMRS

DMRS

DMRS

મેthod OF NOTIFYING RESOURCE
ALLOCATION FOR DEMODULATION
REFERENCE SIGNALS

TECHNICAL FIELD

The present invention relates to a cellular mobile communication system, and more particularly, to a method for allocating downlink transmission power in a cellular communication system employing downlink beam-forming technique. Accordingly, a method of notifying resource allocation for Demodulation Reference Signal (DMRS) is provided.

BACKGROUND ART

In the conventional designs for LTE systems, downlink reception at a User Equipment (UE) is facilitated by channel estimation and symbol detection based on Cell specific Reference Signal (CRS). Since the CRS is a common reference signal, operations such as downlink data transmission power allocating and precoding at a base station (eNB) side need to be signaled to the UE such that the channel estimation and symbol demodulation can be performed at the UE side. However, this causes some inconvenience for multi-user MIMO scheduling and power allocation.

In discussion of technical researches and standards for IMT-Advanced (e.g., LTE-Advanced) technology, a beam-forming technique is introduced, in which a UE uses a dedicated DMRS for channel estimation and symbol detection and the same precoding operation is performed on both user data and the DMRS to improve the downlink transmission performance.

The use of DMRS, which is subjected to the same operations as the data, makes the power allocation, precoding and scheduling for the UE more flexible at the base station. A certain offset is maintained between the power of the downlink data and the power of DMRS, such that the base station does not need to signal power allocation information. As for LTE/LTE-Advanced system, a certain offset is maintained between the power spectral density of data and the power spectral density of DMRS. In a DMRS design, however, there are a plurality of multiplexing approaches such as Frequency Division Multiplexing (FDM) and Code Division Multiplexing (CDM), such that it is difficult to maintain a fixed offset between the power of DMRS and the power of downlink data. Thus, the base station is still required to signal to the UE a power ratio between the DMRS and the downlink data, which causes a lot of inconveniences for multi-user power allocation in a Multi-User Multiple Input Multiple Output (MU-MIMO) mode.

Additionally, in order to realize Single User Multiple Input Multiple Output (SU-MIMO) and MU-MIMO, the use of a dedicated DMRS makes the system overhead for DMRS vary with the change in the number of layers multiplexed on channel resources. Thus, for different numbers of the multiplexed layers, it is required for the UE to obtain corresponding DMRS resource information and to employ a corresponding channel estimation approach. In the MU-MIMO operation mode, different DMRS resources used by the individual UEs will result in a large amount of combinations and an increased system signaling overhead on the downlink.

In light of the above, a solution for notification of DMRS resource allocation based on a fixed DMRS power offset is provided, capable of reducing signaling overhead for power allocation in the system, improving the efficiency of power amplifier and increasing the flexibility of system scheduling. A method of notifying antenna port resource allocation for DMRS is also provided.

SUMMARY OF INVENTION

In order to realize a flexible power allocation, a certain offset is maintained between the power of DMRS and the power of data. The DMRSs for all the layers involved in spatial multiplexing have the same power offset. A channel rank corresponds to a certain number of DMRS signals. For different numbers of DMRSs, there may be different approaches for DMRS multiplexing, such as CDM, FDM and a combination thereof. Therefore, a particular channel rank corresponds to a particular DMRS distribution pattern and a corresponding power offset parameter.

A UE obtains the channel rank, the DMRS distribution pattern or the configuration information for a DMRS antenna port of the current system by means of signaling, so as to perform channel estimation and demodulation. Further, the UE in the MU-MIMO mode can detect DMRS allocation information for other UEs to perform suppression or cancellation of multi-user interferences.

According to an embodiment of the present invention, a method of notifying resource allocation for Demodulation Reference Signal (DMRS) is provided, which comprises: notifying, by a base station, to a user equipment a power offset value between an average EPRE value for data symbols and an average EPRE value for the DMRS at each layer in a semi-static or static manner; notifying, by the base station, to the user equipment a current channel rank or a current DMRS distribution pattern for the user equipment dynamically; and determining, by the user equipment, an allocated DMRS antenna port based on a correspondence between the received channel rank and an allocation of DMRS antenna port, thereby obtaining resource allocation information for the DMRS.

Preferably, the base station notifies, to individual user equipments in a Multi-User Multiple Input Multiple Output (MU-MIMO) mode, power offset values which are different from one another; the base station notifies, to individual user equipments in a Single User Multiple Input Multiple Output (SU-MIMO) mode, power offset values which are identical for the respective layers; or the base station notifies, to individual user equipments in a hybrid SU-MIMO/MU-MIMO mode, power offset values which are different from one another for the individual user equipments but identical for the respective layers of the same user equipment.

Preferably, the base station dynamically notifies to the user equipment the DMRS distribution pattern, a start numbering of allocated DMRS antenna port and the current channel rank, or the number of layers, for the user equipment. In this case, the user equipment determines the allocated DMRS antenna port based on the DMRS distribution pattern, the start numbering of allocated DMRS antenna port and the current channel rank, or the number of layers, for the user equipment as notified, thereby obtaining the resource allocation information for the DMRS.

More preferably, the base station sequentially allocates the numbering of the DMRS antenna port.

Preferably, the base station dynamically notifies to the user equipment the DMRS distribution pattern and bit information associated with the allocation of the DMRS antenna port. In this case, the user equipment determines the allocated DMRS antenna port based on the DMRS distribution pattern and the bit information associated with the allocation of the DMRS antenna port as notified; and determines the current channel rank, or the number of layers, for the user equipment based on the total number of the allocated antenna port(s), thereby obtaining the resource allocation information for the DMRS.

Preferably, the base station dynamically notifies to the user equipment the DMRS distribution pattern and the current channel rank, or the number of layers, for the user equipment. In this case, the user equipment determines the allocated DMRS antenna port based on the DMRS distribution pattern and the current channel rank, or the number of layers, for the user equipment as notified, as well as a start numbering of the DMRS antenna port determined from identification information associated with the user equipment itself, thereby obtaining the resource allocation information for the DMRS.

More preferably, the base station sequentially allocates the numbering of the DMRS antenna port.

More preferably, the start numbering of the DMRS antenna port is obtained by applying a mapping function shared between the base station and the user equipment to the identification information associated with the user equipment itself.

Preferably, the base station dynamically notifies to the user equipment an index number in a shared DMRS allocation configuration table. In this case, the user equipment inquires the shared DMRS allocation configuration table based on the index number to determine the allocated DMRS antenna port and the total number of layer(s) transmitted by the base station, thereby obtaining the resource allocation information for the DMRS.

Preferably, for all frequency bands for all the user equipments, a maximum value for the total number of layer(s) transmitted from the base station to all the user equipments is $R_{max}$ and the total rank or the total number of layer(s), R, as notified by the base station to the individual user equipments takes a value of $R_{max}$; and accordingly, if the base station notifies to the user equipment a DMRS distribution pattern, the DMRS distribution pattern corresponds to $R_{max}$.

Preferably, any one channel rank corresponds to only one DMRS distribution pattern; and any one DMRS distribution pattern corresponds to at least one channel rank.

Preferably, the user equipment detects, in its own frequency band, a reception power or correlation for its unused DMRS antenna port to determine whether the DMRS antenna port is allocated to another user equipment; and performs, when a DMRS antenna port is determined as being allocated to another equipment, channel estimation on the DMRS antenna port to suppress or cancel interference from the another user equipment corresponding to the DMRS antenna port.

BRIEF DESCRIPTION OF DRAWINGS

The above and further objects, features and advantages will be more apparent from the following description of the preferred embodiments of the present invention with reference to the figures, in which.

DESCRIPTION OF EMBODIMENTS

Some particular embodiments of the present invention will be described in the following such that the implementation steps of the present invention can be clearly detailed. While these embodiments are directed to a mobile communication system utilizing a dedicated DMRS on downlink (particularly an LTE-Advanced cellular mobile communication system), it is to be noted that the present invention is not limited to these applications and can be applied to other related communication systems.

In the following, the preferred embodiments of the present invention will be detailed with reference to the figures. In the present description, details and functions unnecessary for the present invention will be omitted, so as not to obscure the understanding the present invention.

Figure 1:
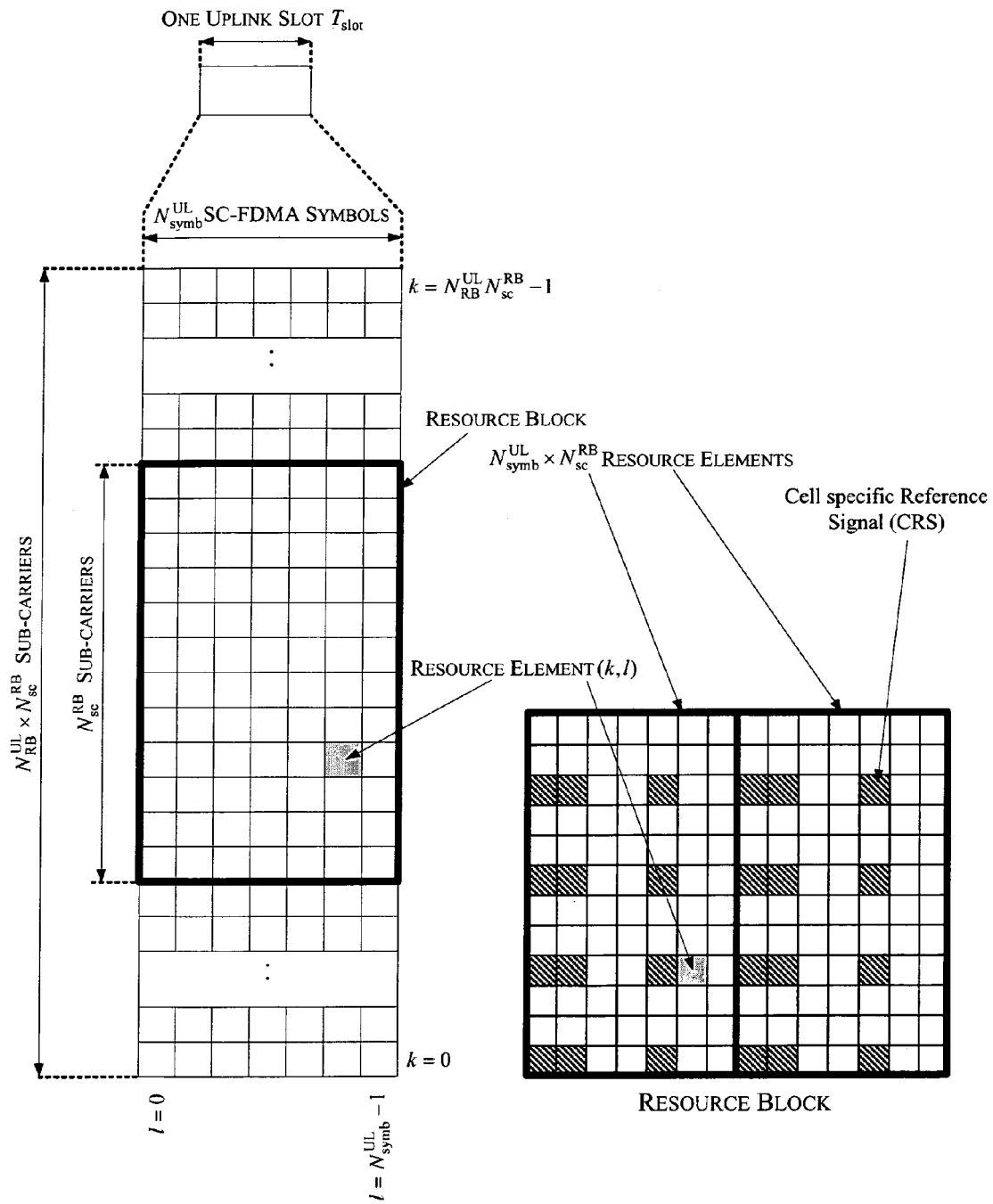
FIG. 1 is a schematic diagram illustrating a slot structure of the conventional LTE system (cf. 3GPP 36.211)

In an LTE system, a Cell-specific Reference Signal (CRS) is required for a user equipment (UE) to perform channel estimation and demodulation. The slot structure of the CRS is shown in FIG. 1 (see 3GPP 36.211 for further details). In contrast to LTE, a UE in an LTE-Advanced system performs channel estimation and symbol detection mainly by means of a precoding Demodulation Reference Signal (DMRS). On the downlink, the UE may be in one of the three following modes:

SU-MIMO mode, in which all the layers belong to the same UE;

MU-MIMO mode, in which each layer belongs to different UE; and

Hybrid SU-MIMO/MU-MIMO mode, in which the same time-frequency channel resource(s) is/are multiplexed among a plurality of UEs and there is at least one UE in the SU-MIMO mode.

If the total number of layers (channel rank) for all the UEs transmitted by the system over a given resource is R, the number of layers which is transmitted by the system for the UE over the same channel resource is r, the number of antennas at the base station side is M (M=8, for example) and the number of reception antennas at the UE side is also M, then r≤R, R≤M. If and only if the UE is in the SU-MIMO mode, in which case the number of UEs simultaneously served by the system is 1, then r=R.

In order to reduce the overhead of the reference signal, different values of R may correspond to different multiplexing approaches of DMRS. Table 1 shows the different multiplexing approaches used for the DMRS for different values of R.

TABLE 1

| Number of Antennas | No. | Channel Rank | CDM | CDM + FDM |
|---|---|---|---|---|
| M = 8 | 1 | R = 2 | ✓ | |
|  | 2 | 2 < R ≤ 4 | | ✓ |
|  | 3 | 4 < R ≤ 8 | ✓ | ✓ |
|  | 4 | R = 1 | | |
| M = 4 | 5 | R = 2 | ✓ | |
|  | 6 | 2 < R ≤ 4 | | ✓ |
|  | 7 | R = 1 | | |
| M = 2 | 8 | R = 2 | ✓ | |
|  | 9 | R = 1 | | |

Figure 2:
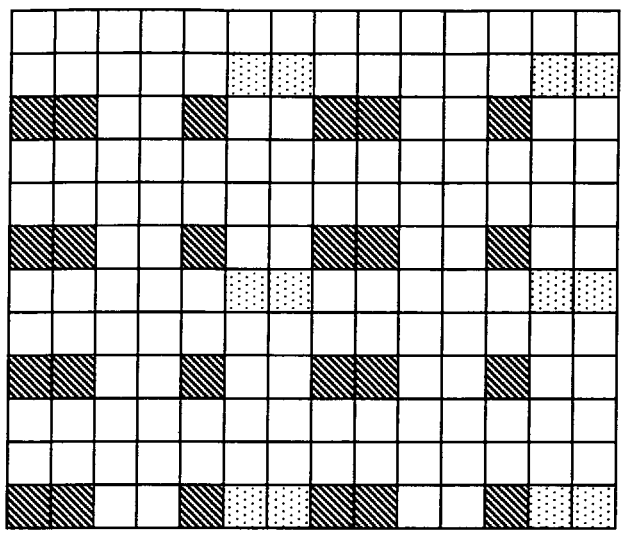
FIG. 2 is a schematic diagram illustrating an exemplary DMRS distribution pattern when the channel rank (the total number of layers) $R \leq 2$.
Figure 2:

In correspondence to Table 1, FIG. 2 gives an exemplary DMRS distribution pattern for the system with R≤2. In this pattern (Nos. 1, 4, 5 and 7-9 in Table 1), DMRSs corresponding to different layers are distinguished in a CDM manner. In such a case, the code length is 2, and an orthogonal sequence having a length of 2 as used by each DMRS is extended and mapped onto two (2) Resource Elements (REs).

Figure 3:
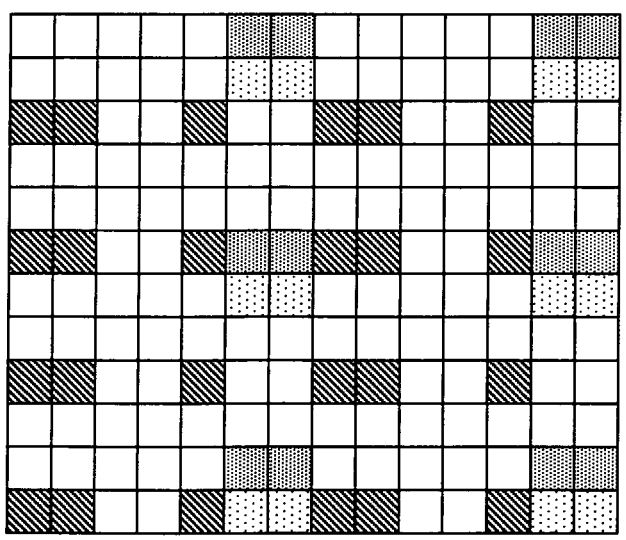
FIG. 3 is a schematic diagram illustrating an exemplary DMRS distribution pattern when the channel rank (the total number of layers) $2 < R \leq 4$.
Figure 3:

FIG. 3 gives an exemplary DMRS distribution pattern for the system with 2<R≤4. In this pattern (Nos. 2 and 6 in Table 1), DMRSs corresponding to different layers are distinguished in a CDM and a FDM manner. In such a case, the code length is 2, and an orthogonal sequence having a length of 2 as used by each DMRS is extended and mapped onto two (2) REs.

Figure 4:
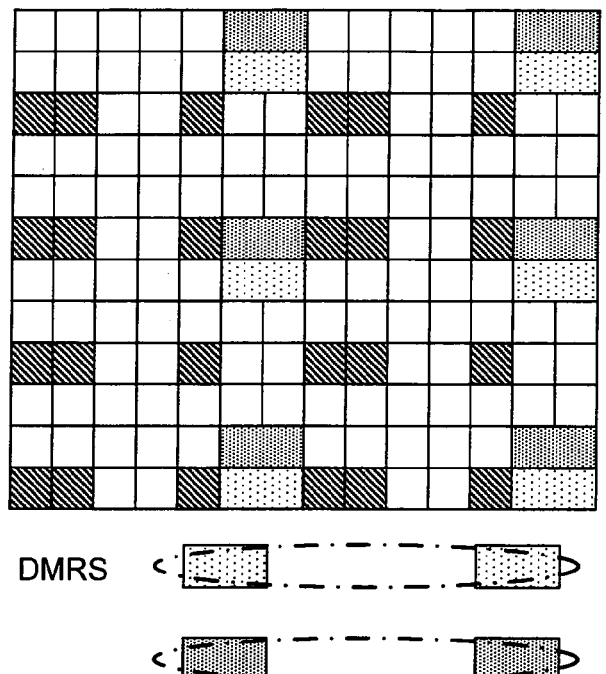
FIG. 4 is a schematic diagram illustrating an exemplary DMRS distribution pattern when the channel rank (the total number of layers) $4 < R \leq 8$.
Figure 5:
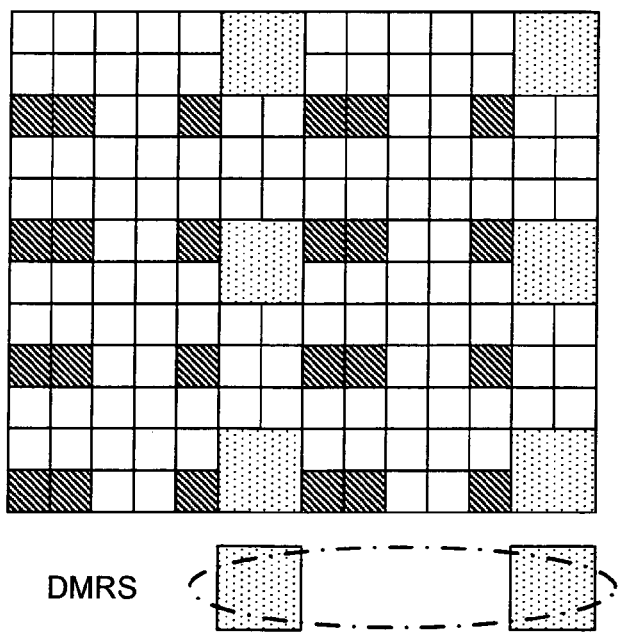
FIG. 5 is a schematic diagram illustrating another exemplary DMRS distribution pattern when the channel rank (the total number of layers) $4 < R \leq 8$.
Figure 6:
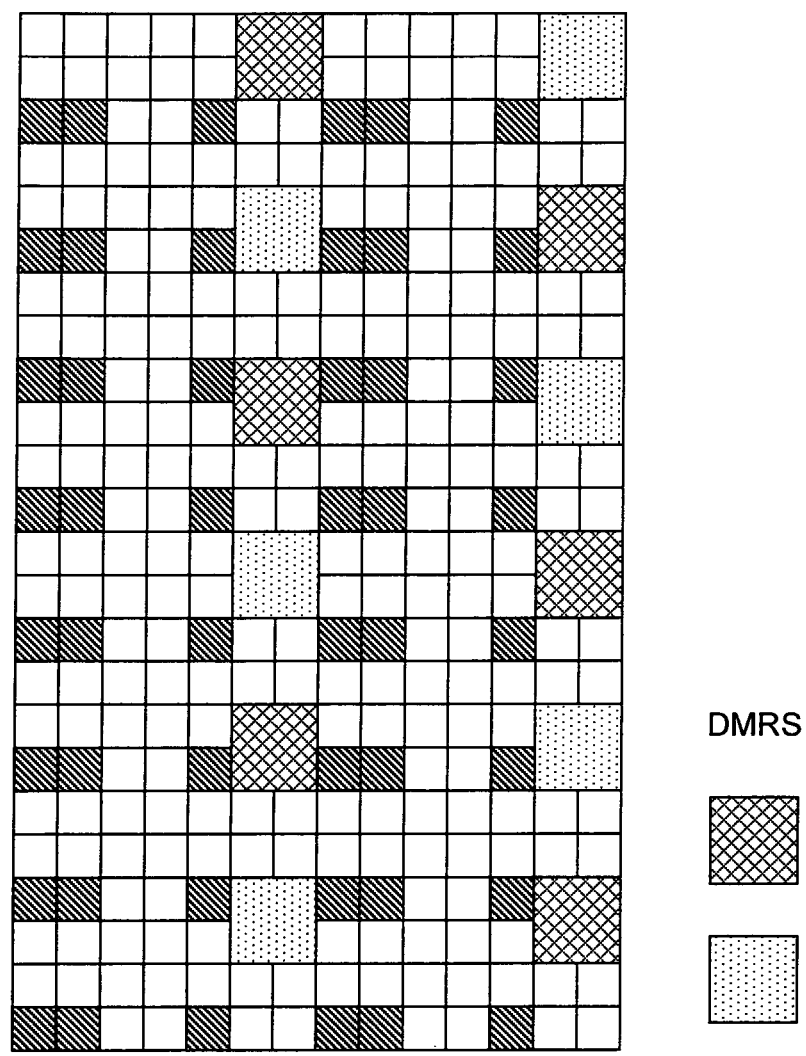
FIG. 6 is a schematic diagram illustrating a further exemplary DMRS distribution pattern when the channel rank (the total number of layers) $4 < R \leq 8$.

FIGS. 4-6 give three exemplary DMRS distribution patterns for the system with 4<R≤8 (No. 3 in Table 1).

In the pattern of Scheme 1 as shown in FIG. 4, DMRSs corresponding to different layers are distinguished in a CDM and a FDM manner. In such a case, the code length is 4, and an orthogonal sequence having a length of 4 as used by each DMRS is extended and mapped onto four (4) REs.

In the pattern of Scheme 2 as shown in FIG. 5, DMRSs corresponding to different layers are distinguished in a CDM manner. In such a case, the code length is 8, and an orthogonal sequence having a length of 8 as used by each DMRS is extended and mapped onto eight (8) REs.

In the pattern of Scheme 3 as shown in FIG. 6, DMRSs corresponding to different layers are distinguished in a CDM and a FDM manner. In such a case, the code length is 4, and an orthogonal sequence having a length of 4 as used by each DMRS is extended and mapped onto four (4) REs. This pattern differs from Scheme 1 as shown in FIG. 4 in that it requires that the number of resource blocks allocated by the base station for the UE must be even.

Power Allocation and Power Offset

Ideally, the base station can dynamically allocate different transmission powers to data at each layer for a UE in the SU-MIMO mode, or to each UE in the MU-MIMO mode. Such dynamic power adjustment can be effectively adapted to channel variations, so as to improve spectral efficiency. To achieve this dynamic power allocation while reducing signaling overhead, a fixed ratio has to be maintained between the transmission power of DMRS and the transmission power of corresponding data. With an agreed fixed ratio, it is possible to perform symbol detection based on the result of DMRS channel estimation. Also, synchronous adjustment of transmission powers for DMRS and data symbols can be achieved dynamically. Further, as there is a plurality of multiplexing approaches for DMRS (such as FDM, CDM, etc.), the Energy Per Resource Element (EPRE) of DMRS varies from one multiplexing approach to another. In summary, after determining the transmission power for data at each layer, the base station determines the EPRE for DMRS at each layer based on the multiplexing approach of DMRS and the ratio between the transmission power of DMRS at each layer and the transmission power of data symbols at the corresponding layer.

With a given channel rank R, the DMRS distribution pattern and the DMRS multiplexing approach can be determined accordingly. Different channel ranks R imply different DMRS distribution patterns and different overheads, with respect to the bandwidth usage of the UE, for all layers. Since, with a given channel rank R, the DMRS occupies a constant amount of time-frequency channel resources, the ratio between the transmission power of each DMRS and the transmission power of data symbols at the corresponding layer corresponds to the ratio between the average EPRE for the DMRS at the layer and the average EPRE for the data symbols at the layer. The average EPRE for the DMRS at a layer refers to the ratio between the total amount of EPREs of all the DMRSs at the layer and the total number of REs occupied by all the DMRSs within the bandwidth allocated to the UE. Likewise, the average EPRE for the data at a layer refers to the ratio between the total amount of EPREs of all the data symbols at the layer and the total number of REs occupied by the layer within the bandwidth allocated to the UE. The average EPRE for the DMRS at layer i is defined as $\bar{p}_{DMRS\_i}$:

$$\bar{P}_{DMRS\_i} = \frac{1}{N} \sum P_{DMRS\_i}$$

where N denotes the number of REs occupied by all the DMRSs.

[Exemplary Explanation for $\bar{p}_{DMRS\_i}$]

Figure 7:
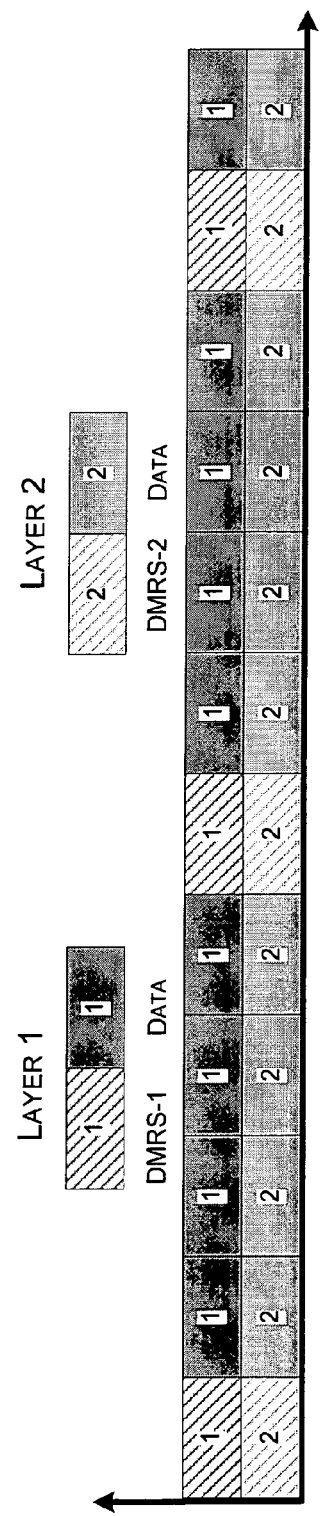
FIG. 7 is a schematic diagram illustrating relative magnitudes of average EPREs, $\Delta_R$, $\bar{p}_{DMRS\_i}$, and $p_{DMRS\_i}$.

As shown in FIG. 7, an OFDM symbol in a resource block contains 12 REs; the total number of REs used by DMRS is N=3; the multiplexing approach is CDM; and the EPRE for the DMRS at layer i is $p_{DMRS\_i}$. In this case, the average $\bar{p}_{DMRS\_i}$ can be derived as:

$$\bar{P}_{DMRS\_i} = \frac{3 P_{DMRS\_i}}{3} = P_{DMRS\_i}, \, , i = 1, 2, \ldots R$$

$$P_{DMRS\_i} = \bar{P}_{DMRS\_i}$$

Figure 8:
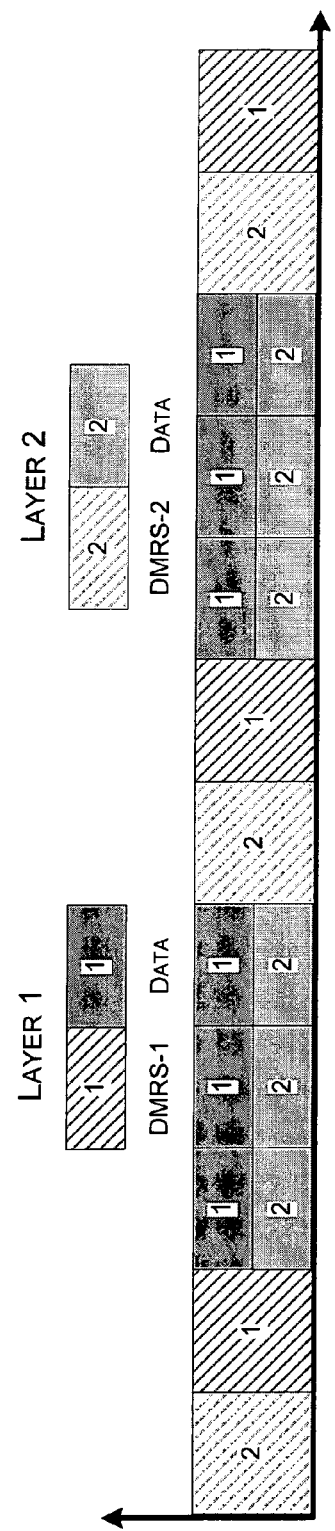
FIG. 8 is another schematic diagram illustrating relative magnitudes among average EPREs, $\Delta_R$, $\bar{p}_{DMRS\_i}$, and $p_{DMRS\_i}$.

As shown in FIG. 8, an OFDM symbol in a resource block contains 12 REs; the total number of REs used by DMRS is N=6; the multiplexing approach is a hybrid of CDM and FDM; and the EPRE for the DMRS at layer i is $p_{DMRS\_i}$. In this case, the average $\bar{p}_{DMRS\_i}$ can be derived as:

$$\bar{P}_{DMRS\_i} = \frac{3P_{DMRS\_i}}{6} = \frac{P_{DMRS\_i}}{2}, \, , i = 1, 2, \ldots R$$

$$P_{DMRS\_i} = 2\bar{P}_{DMRS\_i}$$

Figure 9:
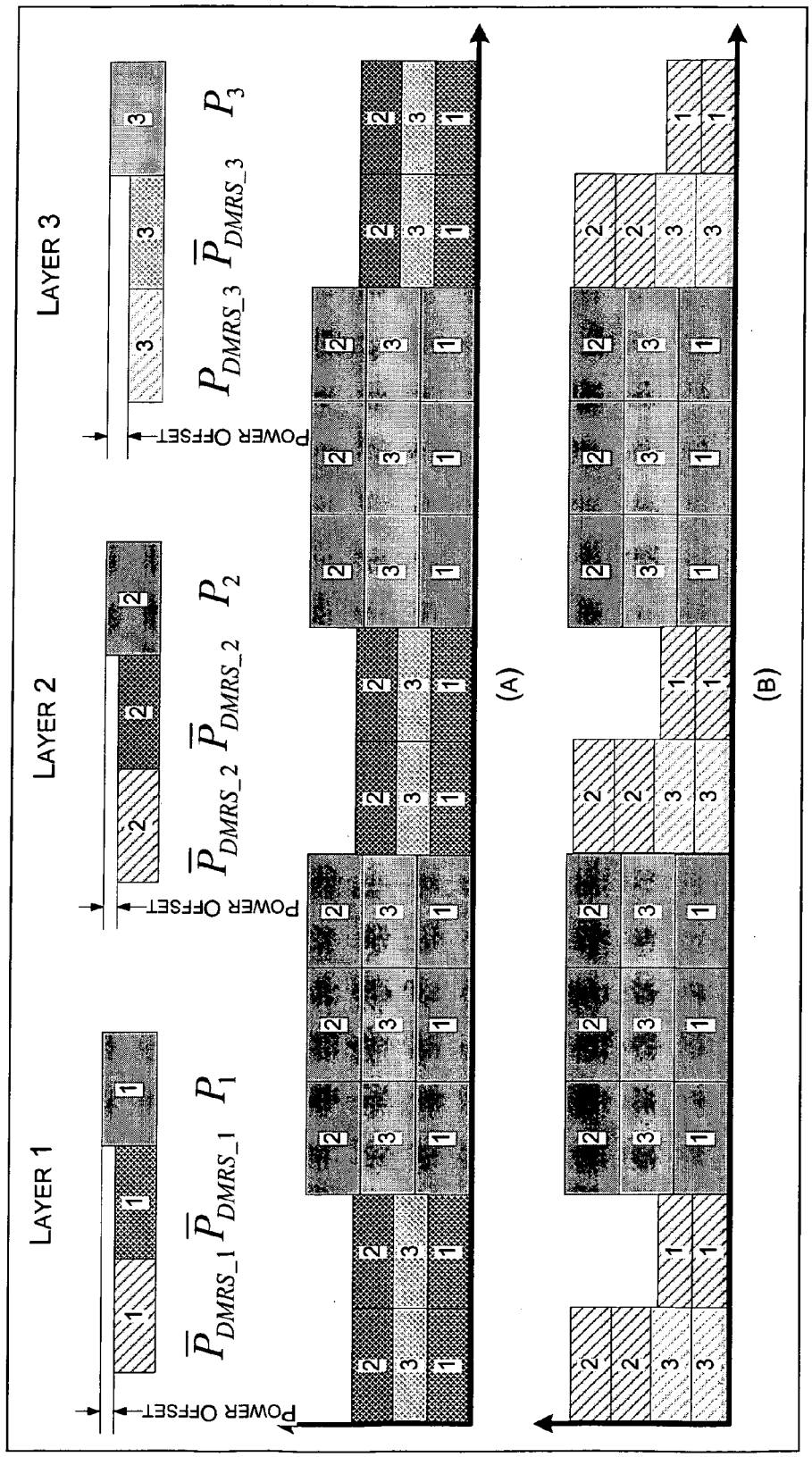
FIG. 9 is another schematic diagram illustrating relative magnitudes among average EPREs, $\Delta_R$, $\bar{p}_{DMRS\_i}$, and $p_{DMRS\_i}$.

As shown in FIG. 9, a resource block contains 12 REs; the total number of REs used by DMRS is N=6; the multiplexing approach is FDM; and the EPRE for the DMRS at layer i is $p_{DMRS\_i}$. In this case, the average $\bar{p}_{DMRS\_i}$ can be derived as:

$$\bar{P}_{DMRS\_i} = \frac{3P_{DMRS\_i}}{6} = \frac{P_{DMRS\_i}}{2}, \, , i = 1, 2, \ldots R$$

$$P_{DMRS\_i} = 2\bar{P}_{DMRS\_i}$$

It can be derived from above that:

$$p_{DMRS\_i} = \bar{p}_{DMRS\_i} + \Delta_R$$

Herein, $\Delta_R$ is an offset parameter determined by the DMRS distribution pattern, which reflects the offset of the EPRE for each DMRS RE with respect to the average EPRE for the DMRSs at each layer.

$\bar{p}_{DMRS\_i}$ can be determined at the base station based on the EPRE for data symbols at each layer and the ratio between the average EPRE for the DMRS and the average EPRE for the data symbol:

$$\bar{p}_{DMRS\_i} = \text{poweroffset} + p_i (\text{dB}), i=1, 2, \ldots r$$

where poweroffset is an offset between the average EPRE for data symbols at each layer, $p_i$, and the average EPRE for the DMRS, $\bar{p}_{DMRS\_i}$, as signaled from the base station to the UE in a semi-static or static manner. Herein, $p_i$ is the average EPRE of the data symbols at layer i. As such, the EPRE for the DMRS can be denoted as:

$$p_{DMRS\_i} = \text{poweroffset} + \Delta_R + p_i (\text{dB}), i=1, 2, \ldots r.$$

It can be seen from the above equation that, as poweroffset and $\Delta_R$ are both static or semi-static parameters, a fixed ratio can be maintained between the EPRE for each DMRS, $p_{DMRS\_i}$, and the energy of the data symbols at the corresponding layer, $p_i$, such that $p_{DMRS\_i}$ may vary synchronously with the change in the state of $p_i$.

Value of Poweroffset

Poweroffset is a UE-related parameter. Specifically:
for individual UEs in the MU-MIMO mode, their poweroffset values are different from one another;
for a UE in the SU-MIMO mode, its individual layers have the same poweroffset value; and
for UEs in the hybrid SU-MIMO/MU-MIMO mode, the individual UEs have poweroffset values which are different from one other; and the individual layers for the same UE have the same poweroffset value.

In FIG. 9, poweroffset<0 dB, which means that the average EPRE for the DMRS is smaller than the average EPRE for the data symbols, as shown in FIG. 9(*a*). The relative magnitudes of the DMRS EPRE and the average EPRE for the data symbols are illustrated in FIG. 9(*b*).

Figure 10:
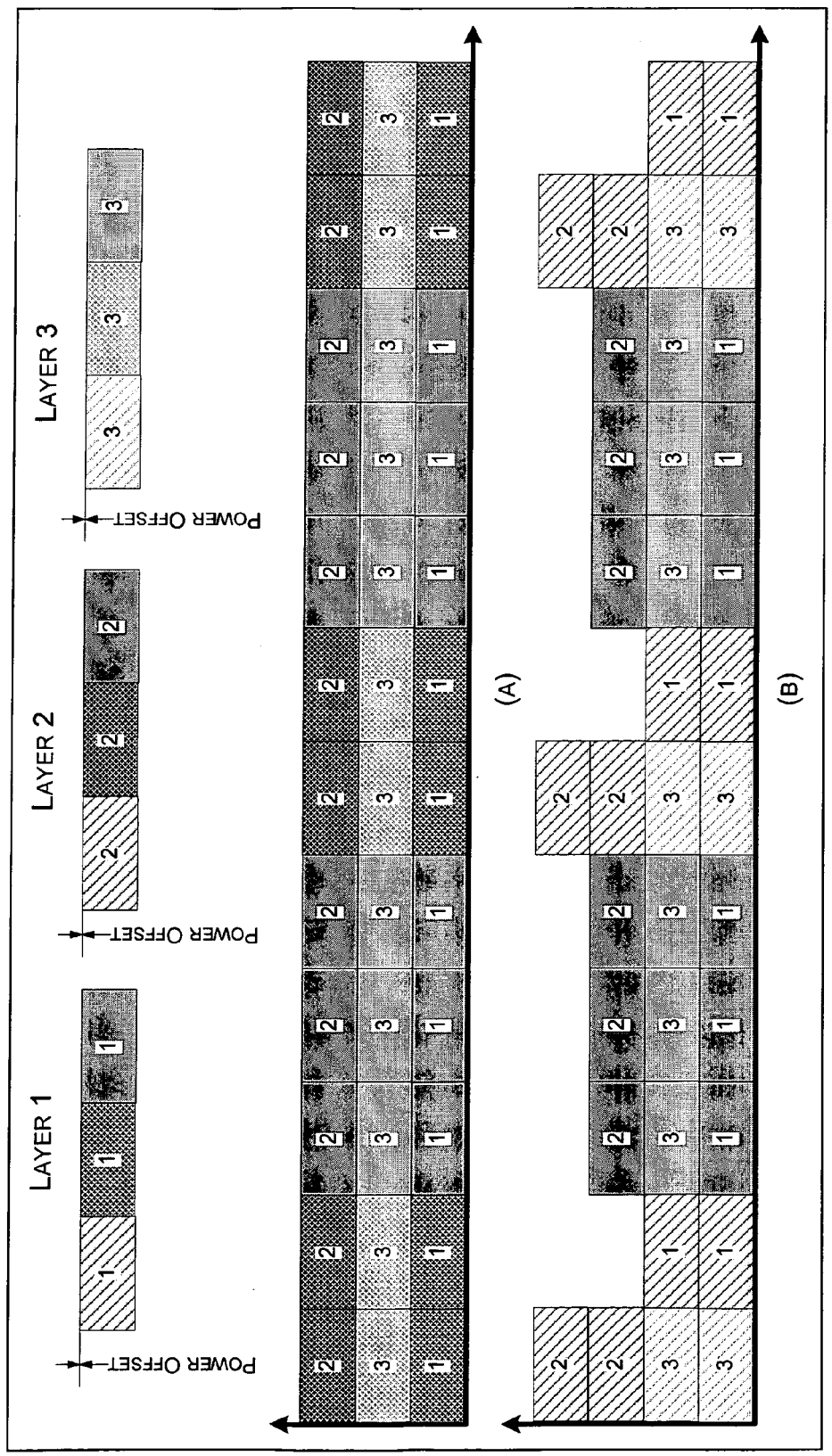
FIG. 10 is another schematic diagram illustrating relative magnitudes among average EPREs, $\Delta_R$, $\bar{p}_{DMRS\_i}$, and $p_{DMRS\_i}$.

In FIG. 10, poweroffset=0 dB, which means that the average EPRE for the DMRS equals to the average EPRE for the data symbols, as shown in FIG. 10(*a*). The relative magnitudes of the DMRS EPRE and the average EPRE for the data symbols are illustrated in FIG. 10(*b*).

Calculation of $\Delta_R$

Within the same OFDM symbol in the bandwidth allocated for the UE, the ratio between the total number of REs occupied by the DMRS at each layer and total number of REs occupied by all the DMRSs within the bandwidth is 1/f, then $$\Delta_R = 10 \log f.$$

As shown in FIG. 7, $$\Delta_R = 10 \log 1 = 0 \text{ (dB)}.$$

As shown in FIGS. 8, 9 and 10, $$\Delta_R = 10 \log 2 = 3 \text{ (dB)}.$$

Generally, r layers of data (r≥f) are spatially multiplexed in a single resource block:
when f=1, the DMRSs of the respective spatially multiplexed layers of data multiplex the time-frequency channel resources in a CDM manner, as shown in FIG. 7;
when 1<f<r, the DMRSs at the respective layers are located in f sub-carrier positions, i.e., r DMRSs are divided into f groups each corresponding to a different sub-carrier; the DMRSs of the respective layers of data multiplex the time-frequency channel resources in a hybrid FDM/CDM manner, as shown in FIGS. 9 and 10; and
when f=r, all the DMRSs multiplex the time-frequency channel resources in a FDM manner, as shown in FIG. 8.

When the number of antennas at each of the base station side and the UE side is M=8 and the channel rank satisfies 4<r≤8, there may be a plurality of DMRS usage modes, as shown in FIGS. 4-6.

As shown in FIGS. 4 and 6, $$\Delta_R = 10 \log 2 = 3 \text{ (dB)}, f=2.$$

As shown in FIG. 5, $$\Delta_R = 10 \log 1 = 0 \text{ (dB)}, f=1.$$

In contrast to the scenario in FIG. 5, the DMRS distribution pattern shown in FIG. 6 requires that the number of resource blocks (RBs) allocated by the base station for the UE must be even.

Figure 11:
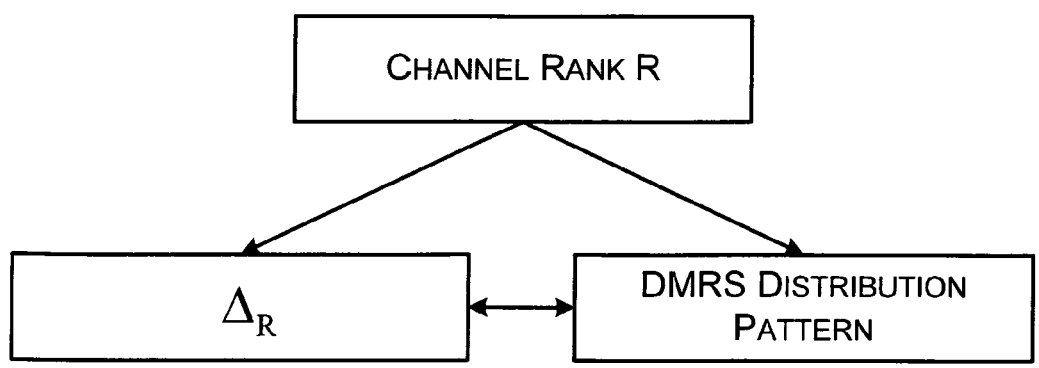
FIG. 11 is a schematic diagram illustrating a relationship among a channel rank R, a DMRS distribution pattern and $\Delta_R$.

As such, there can be a correspondence among $\Delta_R$, the rank R and the DMRS distribution pattern, as shown in FIG. 11, in which:
any channel rank R corresponds to a particular DMRS distribution pattern which in turn may correspond to one or more channel ranks R;
any channel rank R corresponds to a particular offset parameter $\Delta_R$ which in turn may correspond to one or more channel ranks R; and
there is a one-to-one correspondence between the offset parameter $\Delta_R$ and the DMRS distribution pattern.

Figure 12:
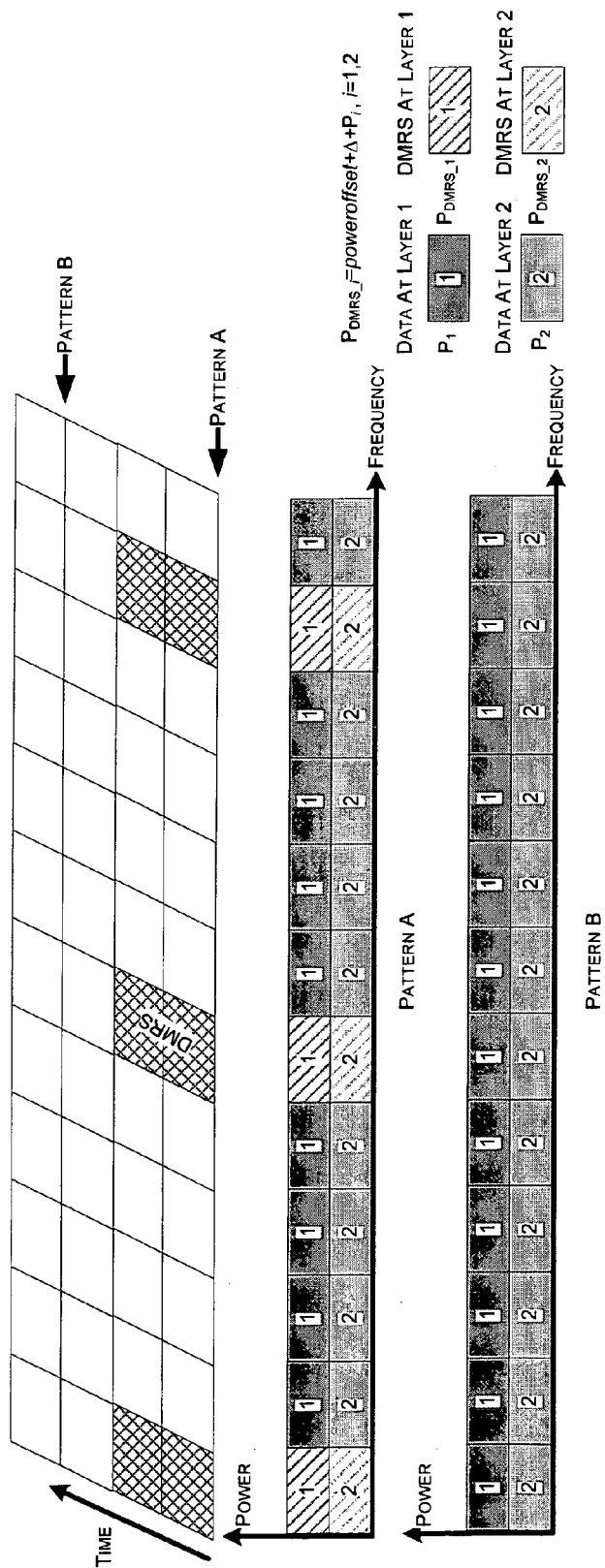
FIG. 12 is a schematic diagram illustrating relative magnitudes between $p_{DMRS\_i}$ and $p_i$ when R=2 and poweroffset=0 dB.

FIG. 12 shows a schematic diagram illustrating relative magnitudes between the DMRS EPRE and the EPRE for data symbols when R=2 and poweroffset=0 dB.

Figure 13:
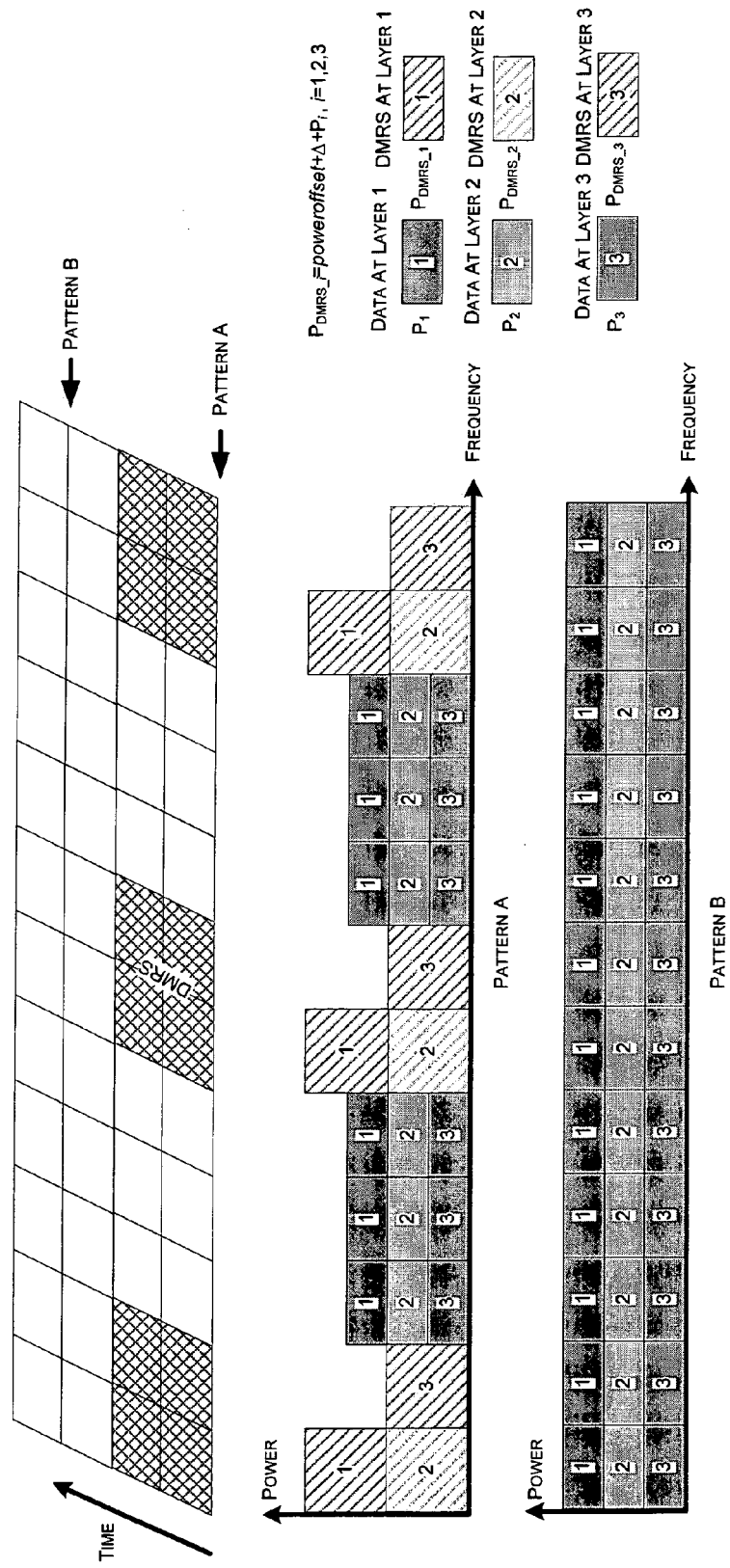
FIG. 13 is a schematic diagram illustrating relative magnitudes between $p_{DMRS\_i}$ and $p_i$ when R=3 and poweroffset=0 dB.

FIG. 13 shows a schematic diagram illustrating relative magnitudes between the DMRS EPRE and the EPRE for data symbols when R=3 and poweroffset=0 dB.

For correct symbol detection, the base station can notify the power offset value (poweroffset) between the DMRS and the data symbols in a semi-static or static manner.

Mapping of Antenna Ports and SU-MIMO/MU-MIMO Signaling

The DMRS distribution pattern can be classified into 3 categories in accordance with the different distribution patterns of DMRS for different channel ranks R, as shown in Table 2. Differences among the 3 categories of DMRS distribution patterns consist in: (1) system overhead for the individual patterns; (2) transmission approaches for DMRS; and (3) channel estimation approaches at the UE side.

TABLE 2

| DMRS Distribution Pattern | Corresponding Channel Rank R | Examples of DMRS Distribution Pattern |
|---|---|---|
| DMRS Distribution Pattern 1 | R ≤ 2 | FIG. 2 |
| DMRS Distribution Pattern 2 | 2 < R ≤ 4 | FIG. 3 |
| DMRS Distribution Pattern 3 | 4 < R ≤ 8 | FIGS. 4, 5 and 6 |

The antenna ports for the individual DMRSs use the same DMRS sequence or have a one-to-one correspondence with the DMRS sequences. As such, the UE can conveniently acquire the DMRS sequence(s) for the individual DMRS antenna ports for channel estimation.

The UE can acquire reference signal information required for channel estimation and symbol detection by any one of the following signaling approaches (Approach 1-5).

Approach 1: The base station signals to the UE a current channel rank. If there is a one-to-one correspondence between the channel rank and the allocation of DMRS antenna port (see Table 3, for example), the UE can determine the individual DMRS antenna port(s) allocated by the base station and a corresponding DMRS sequence.

TABLE 3

| Channel Rank R | Exemplary DMRS Antenna Port Numbering |
|---|---|
| 1 | {0} |
| 2 | {0, 1} |
| 3 | {0, 1, 2} |
| 4 | {0, 1, 2, 3} |
| 5 | {0, 1, 2, 3, 4} |
| 6 | {0, 1, 2, 3, 4, 5} |
| 7 | {0, 1, 2, 3, 4, 5, 6} |
| 8 | {0, 1, 2, 3, 4, 5, 6, 7} |

For example, when acquiring from the base station the current channel rank R=3, the UE can determine by referring to Table 3 that the DMRS antenna ports the base station allocates for the UE is {0,1,2}.

Approach 2: The base station signals to the UE a current DMRS distribution pattern, a start numbering of the allocated DMRS antenna port and a current channel rank (or the number of layers) for the UE. Accordingly, the UE determines the currently allocated DMRS antenna port(s). In this approach, the base station sequentially allocates the numberings of DMRS antenna ports to the UE.

Alternatively, the base station may signal the total number of layers transmitted over the channel resource currently used by the UE and the UE can determine the DMRS distribution pattern accordingly.

Figure 14:
FIG. 14 is a schematic diagram illustrating an allocation of DMRS antenna port.
Figure 15:
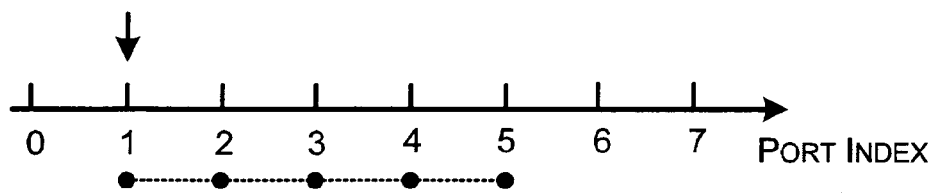
FIG. 15 is another schematic diagram illustrating an allocation of DMRS antenna port.

Referring to FIG. 14, for example, the base station signals that the current DMRS distribution pattern is 2 (corresponding to the numberings of antenna ports of {0,1,2,3}), the start numbering of the current DMRS antenna ports is 1 and the current channel rank (or the number of layers) for the UE is 2. Accordingly, the UE can determine the allocated DMRS antenna ports to be {1, 2}. In this case, it can be determined that the UE is in the hybrid SU-MIMO/MU-MIMO state. As another example, referring to FIG. 15, the base station signals that the current DMRS distribution pattern is 3 (corresponding to the numberings of antenna ports of {0,1,2,3,4,5,6,7}), the start numbering of the current DMRS antenna ports is 1 and the current channel rank (or the number of layers) for the UE is 5. Accordingly, the UE can determine the allocated DMRS antenna ports to be {1,2,3,4,5}.

Approach 3: The base station signals to the UE a current DMRS distribution pattern and bit information associated with the allocation of the respective DMRS antenna ports in that pattern. Accordingly, the UE determines the currently allocated DMRS antenna ports and then determines the current channel rank (or the number of layers) r for the UE based on the number of the allocated antenna ports.

In this approach, the base station can allocate, in an arbitrary manner, the numberings of DMRS antenna ports to the UE. Herein, each antenna port uses a bit identifier.

Alternatively, the base station may signal the total number of layers transmitted over the channel resource currently used by the UE and the UE can determine the DMRS distribution pattern accordingly.

Figure 16:
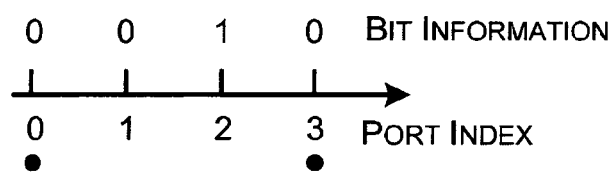
FIG. 16 is another schematic diagram illustrating an allocation of DMRS antenna port.

Referring to FIG. 16, for example, the base station signals that the current DMRS distribution pattern is 2 (in which 4 bits are used to identify the allocation for each antenna port) and the bit information for the antenna port allocation is 1001 (in which "0" indicates an unallocated port and "1" indicates an allocated port). Accordingly, the UE determines the allocated DMRS antenna ports to be {0,3} and the channel rank of the UE itself to be r=2.

Approach 4: The base station signals to the UE a current DMRS distribution pattern and the current channel rank (or the number of layers) for the UE. In this case, the UE calculates a start numbering of DMRS antenna port based on identification information associated with the UE itself, so as to determine the currently allocated DMRS antenna port(s). In this approach, the base station sequentially allocates the numberings of the DMRS antenna ports to the UE.

Alternatively, the base station may signal the total number of layers transmitted over the channel resource currently used by the UE, and the UE can determine the DMRS distribution pattern accordingly.

Figure 17:
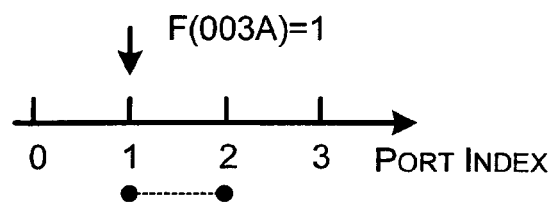
FIG. 17 is another schematic diagram illustrating an allocation of DMRS antenna port.

Referring to FIG. 17, for example, if the base station signals that the current DMRS distribution pattern is 2 (corresponding to the numberings of antenna ports of {0,1,2,3}) and the current channel rank (or the number of layers) for the UE is 2. In this case, the UE calculates the start numbering of the DMRS antenna port as 1 based on its own Radio Network Temporary Identifier (RNTI) (e.g., the RNTI of the UE is 003A (hex), which is mapped by a function as F(003A)=1, where F is a mapping function shared between the base station and the UE), and accordingly, determines the allocated DMRS antenna ports to be {1,2}. At the same time, it can be determined that the UE is in the hybrid SU-MIMO/MU-MIMO state.

Approach 5: The base station shares a DMRS allocation configuration table with the UE and signals to the UE an index number for a DMRS antenna port configuration in the table. In this case, the UE inquires the table based on the index number to determine the specific DMRS antenna port configuration information, the number of layers transmitted by the system for the UE (or the rank of the UE) as well as the total number of layers transmitted by the system over the channel resource used by the UE.

For example, the Table 4 below is a DMRS antenna port configuration table incorporating all the possibilities for the SU-MIMO mode, the MU-MIMO mode and the hybrid thereof. The number of possible combinations can be greatly reduced by applying a certain constraints, so as to reduce the items in Table 4. Preferable constraints may include, for example:

each UE in the hybrid SU-MIMO/MU-MIMO mode can multiplex at most two layers; and
   in the MU-MIMO or hybrid SU-MIMO/MU-MIMO mode, there can be at most 4 UEs.

Table 4 below can be derived from the above two constraints (or, of course, either one of these two constraints or any other constraints). The actual physical time-frequency resource used by the DMRS antenna port(s) depends on the mapping between each DMRS antenna port and the physical time-frequency resource.

The total channel rank in Table 4(a) indicates the total number of layers for all the users as multiplexed on the time-frequency channel resource used by the UE.

Table 4(a) is an information table containing the total channel rank and the DMRS antenna port configuration for the UE. With this table, the UE can determine the current channel rank r of its own, the total channel rank R and the specific resource allocation information for the DMRS antenna port.

Table 4(b) is an information table containing the DMRS distribution pattern and the DMRS antenna port configuration for the UE. With this table, the UE can determine the current channel rank r of its own and the specific allocation information for the DMRS antenna port. In this case, the UE cannot determine the total channel rank.

TABLE 4(a)

|  | Total Channel Rank | DMRS Antenna Port Configuration |
|---|---|---|
| 1 | 1 | {0} |
| 2 | 1 | {1} |
| 3 | 2 | {1} |
| 4 | 2 | {0} |
| 5 | 2 | {0, 1} |
| 6 | 3 | {0, 1, 2} |
| 7 | 3 | {0, 1} |
| 8 | 3 | {2} |
| 9 | 3 | {1} |
| 10 | 3 | {0} |
| 11 | 4 | {0, 1, 2, 3} |
| 12 | 4 | {0, 1} |
| 13 | 4 | {2, 3} |
| 14 | 4 | {3} |
| 15 | 4 | {2} |
| 16 | 4 | {1} |
| 17 | 4 | {0} |
| 18 | 5 | {0, 1, 2, 3, 4} |
| 19 | 5 | {0, 1} |
| 20 | 5 | {2, 3} |
| 21 | 5 | {4} |
| 22 | 5 | {3} |
| 23 | 5 | {2} |
| 24 | 5 | {1} |
| 25 | 6 | {0, 1, 2, 3, 4, 5} |
| 26 | 6 | {0, 1} |
| 27 | 6 | {2, 3} |
| 28 | 6 | {4, 5} |
| 29 | 6 | {5} |
| 30 | 6 | {4} |
| 31 | 6 | {3} |
| 32 | 6 | {2} |
| 33 | 7 | {0, 1, 2, 3, 4, 5, 6} |
| 34 | 7 | {0, 1} |
| 35 | 7 | {2, 3} |
| 36 | 7 | {4, 5} |
| 37 | 7 | {6} |
| 38 | 7 | {5} |
| 39 | 7 | {4} |
| 40 | 7 | {3} |
| 41 | 8 | {0, 1, 2, 3, 4, 5, 6, 7} |

TABLE 4(a)-continued

|  | Total Channel Rank | DMRS Antenna Port Configuration |
|---|---|---|
| 42 | 8 | {0, 1} |
| 43 | 8 | {2, 3} |
| 44 | 8 | {4, 5} |
| 45 | 8 | {6, 7} |
| 46 | 8 | {7} |
| 47 | 8 | {6} |
| 48 | 8 | {5} |
| 49 | 8 | {4} |

TABLE 4(b)

|  | DMRS Distribution Pattern | DMRS Antenna Port Configuration |
|---|---|---|
| 1 | 1 | {0} |
| 2 |  | {1} |
| 3 |  | {1} |
| 4 |  | {0} |
| 5 |  | {0, 1} |
| 6 | 2 | {0, 1, 2} |
| 7 |  | {0, 1} |
| 8 |  | {2} |
| 9 |  | {1} |
| 10 |  | {0} |
| 11 |  | {0, 1, 2, 3} |
| 12 |  | {0, 1} |
| 13 |  | {2, 3} |
| 14 |  | {3} |
| 15 |  | {2} |
| 16 |  | {1} |
| 17 |  | {0} |
| 18 | 3 | {0, 1, 2, 3, 4} |
| 19 |  | {0, 1} |
| 20 |  | {2, 3} |
| 21 |  | {4} |
| 22 |  | {3} |
| 23 |  | {2} |
| 24 |  | {1} |
| 25 |  | {0, 1, 2, 3, 4, 5} |
| 26 |  | {0, 1} |
| 27 |  | {2, 3} |
| 28 |  | {4, 5} |
| 29 |  | {5} |
| 30 |  | {4} |
| 31 |  | {3} |
| 32 |  | {2} |
| 33 |  | {0, 1, 2, 3, 4, 5, 6} |
| 34 |  | {0, 1} |
| 35 |  | {2, 3} |
| 36 |  | {4, 5} |
| 37 |  | {6} |
| 38 |  | {5} |
| 39 |  | {4} |
| 40 |  | {3} |
| 41 |  | {0, 1, 2, 3, 4, 5, 6, 7} |
| 42 |  | {0, 1} |
| 43 |  | {2, 3} |
| 44 |  | {4, 5} |
| 45 |  | {6, 7} |
| 46 |  | {7} |
| 47 |  | {6} |
| 48 |  | {5} |
| 49 |  | {4} |

It can be seen from the above Table 4(a) and Table 4(b), the base station can notify the configuration information for DMRS antenna port to the UE using 6-bit signaling ($2^5 < 49 < 2^6$), including the total number of layers the system multiplexes on the resource used by the UE. According to Table 4(a), for example, if the UE reads bit information of 41, then the UE is in the SU-MIMO state, the number of layers transmitted for the UE is 8 and the DMRS antenna ports in use are {0,1,2,3,4,5,6,7}. Similarly, if the UE reads bit information of 20, then the DMRS antenna ports in use are {2,3}, the UE is in the hybrid SU-MIMO/MU-MIMO state and the number of layers transmitted for the UE is 2.

If the base station signals to the UE the current DMRS distribution pattern, it is assumed by default that the UE has the information required for performing channel estimation on all the DMRS antenna ports in this DMRS distribution pattern.

TABLE 5

| DMRS Distribution Pattern | DMRS Antenna Ports |
|---|---|
| DMRS Distribution Pattern 1 | {0, 1} |
| DMRS Distribution Pattern 2 | {0, 1, 2, 3} |
| DMRS Distribution Pattern 3 | {0, 1, 2, 3, 4, 5, 6, 7} |

Referring to Table 5, for example, if the base station signals that the current DMRS distribution pattern is 1, it is assumed by default that the UE has the information on the DMRS antenna ports {0,1}. If the base station signals that the current DMRS distribution pattern is 2, it is assumed by default that the UE has the information on any one of the DMRS antenna ports {0,1,2,3}. If the base station signals that the current DMRS distribution pattern is 3, it is assumed by default that the UE has the information on any one of the DMRS antenna ports {0,1,2,3,4,5,6,7}.

If the base station signals to the UE that the total number of layer for all the users as transmitted on the channel resource used by the UE is R, it is assumed by default that the UE has the configuration information for the R DMRS antenna ports currently configured by the system (including the REs used by the individual DMRS antenna ports and the like) as well as the related information required for performing channel estimation on the R DMRS antenna ports.

TABLE 6

| Total Number of Layers for All The Users | DMRS Antenna Port(s) |
|---|---|
| 1 | {0} |
| 2 | {0, 1} |
| 3 | {0, 1, 2} |
| 4 | {0, 1, 2, 3} |
| 5 | {0, 1, 2, 3, 4} |
| 6 | {0, 1, 2, 3, 4, 5} |
| 7 | {0, 1, 2, 3, 4, 5, 6} |
| 8 | {0, 1, 2, 3, 4, 5, 6, 7} |

Referring to Table 6, for example, if the base station signals that the current total number of layers for all the users is 1, the UEs have the information on the DMRS antenna port {0}. If the base station signals that the current total number of layers for all the users is 2, then the DMRS antenna ports the system configures for all the current UEs are {0,1} and the UEs have the related information required for performing channel estimation on these DMRS antenna ports. If the base station signals that the current total number of layer for all the users is 3, then the DMRS antenna ports the system configures for all the current UEs are {0,1,2} and the UEs have the related information required for performing channel estimation on these DMRS antenna ports.

Herein, the information on the DMRS antenna port may contain DMRS sequence information, time-frequency resources and information on orthogonal sequence used by each antenna port.

In the case where the base station signals the total number of layers for all the users, each user can determine whether it is in the SU-MIMO mode, the MU-MIMO mode or the hybrid SU-MIMO/MU-MIMO mode based on its own allocation information for the DRMS antenna port. In the MU-MIMO mode or the SU-MIMO/MU-MIMO mode, the UE can determine the information on the DMRS antenna port(s) of other UEs.

With the above Approach 5, for example, if the base station signals to the UE that the current configuration information is 20, it can be determined from Table 4(a) that the DMRS antenna ports used by the UE are {2,3}, the total number of layers for all the users is 5 and thus the DMRS antenna ports possibly used by all the other UEs are {0,1,4}.

According to the above Approach 5, if the base station signals to the UE that the current configuration information is 20, it can be determined from Table 4(b) that the DMRS antenna ports used by the UE are {2,3}, the total number of layers for all the users is 3 and thus the DMRS antenna ports possibly used by all the other UEs are {0,1,4,5,6,7}.

If the time-frequency channel resources used by UEs in the multi-user mode do not completely overlap with each other, then, in all the frequency bands for all the UEs, a maximum value for the total number of layers transmitted from the system to all the UEs is $R_{max}$ and the total rank or the total number of layers R as notified by the system to the individual UEs takes a value of $R_{max}$. Accordingly, if the system notifies to the individual UEs the DMRS distribution pattern, the DMRS distribution pattern corresponds to $R_{max}$.

The UE detects, in its own frequency band, a reception power or correlation for its unused DMRS antenna port to determine whether or not a DMRS antenna port is allocated to another UE. When the DMRS antenna port is determined as being allocated to another UE, the UE performs channel estimation on the DMRS antenna port to suppress or cancel interference from the another UE corresponding to the antenna port.

Figure 18:
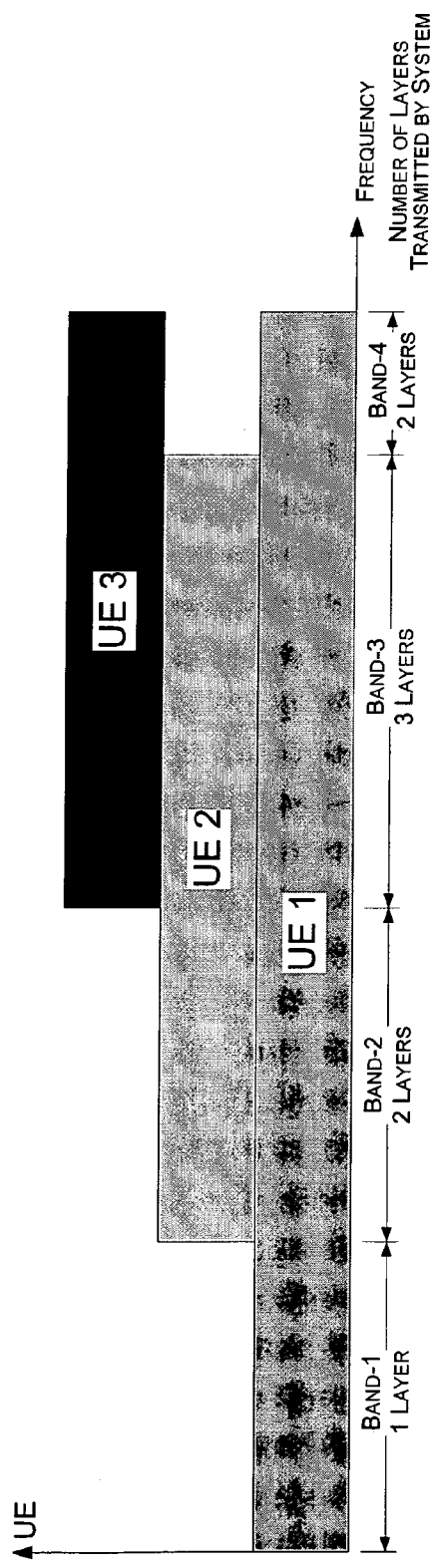
FIG. 18 is a schematic diagram illustrating a DMRS distribution pattern and an allocation of DMRS antenna port when channel resources for individual users in the MU-MIMO state do not completely overlap with each other.

As shown in FIG. 18, the frequency band resources allocated for three UEs each in the MU-MIMO mode (i.e., UE 1, UE 2 and UE 3) are {Band-1, Band-2, Band-3, Band-4}, {Band-2, Band-3} and {Band-3, Band-4}, respectively. With such resource allocation, the total rank (or the number of layers) on the respective frequency bands are shown in Table 7, thereby $R_{max}$=3 at Band-3.

TABLE 7

| Frequency Band | Total Number of Layers Transmitted By System |
|---|---|
| Band-1 | 1 |
| Band-2 | 2 |
| Band-3 | 3 |
| Band-4 | 2 |

If the system signals to the UE 1, UE 2 and UE 3 that the total rank of the current channel is 3, then it can be known from Table 6 that the DMRS antenna ports possibly used by all the current users are {0,1,2}. It is assumed in accordance with Table 4(a) that the DMRS antenna port configuration information for the UE 1, UE 2 and UE 3 is 8, 9 and 10, respectively. In this case, the UE 1 can determine that the DMRS antenna ports used by all the other UEs are {0, 1}, and can thus determine, sequentially at the frequency bands Band-1, Band-2, Band-3 and Band-4, the usage of the DMRS antenna ports {0, 1} by the other UEs based on parameters such as reception power. In the case of correct determination, the UE 1 can suppress or cancel the interference from the other UEs at three frequency bands: Band-2, Band-3 and Band-4. The other UEs can operate in a similar way.

As an alternative, if the system signals to the UE 1, UE 2 and UE 3 that the current DMRS distribution pattern is 2, then it can be known from Table 5 that the DMRS antenna ports possibly used by all the current UEs are {0,1,2,3}. It is assumed in accordance with Table 4(b) that the DMRS antenna port configuration information for the UE 1, UE 2 and UE 3 is 8, 9 and 10, respectively. In this case, the UE 1 can determine that the DMRS antenna ports used by all the other UEs are {0, 1, 3}, and can thus determine, sequentially at the frequency bands Band-1, Band-2, Band-3 and Band-4, the usage of the DMRS antenna ports {0, 1, 3} by the other UEs based on parameters such as reception power. In the case of correct determination, the UE 1 can suppress or cancel the interference from the other UEs at three frequency bands: Band-2, Band-3 and Band-4. The other UEs can operate in a similar way.

The present invention has been described above with reference to the preferred embodiments thereof. It should be understood that various modifications, alternations and additions can be made by those who skilled in the art without departing from the spirits and scope of the present invention. Therefore, the scope of the present invention is not limited to the above particular embodiments but only defined by the claims as attached.

The invention claimed is:

1. A wireless communication method in which a base station apparatus communicates with a user equipment, the wireless communication method comprising:
   transmitting, to the user equipment, bit information, wherein
   the bit information indicates first information indicating one or more antenna ports and second information indicating a number of layers for downlink data symbols; and
   transmitting, to the user equipment, the downlink data symbols and Demodulation Reference Signal (DMRS) on the basis of a power offset between an Energy Per Resource Element (EPRE) for the downlink data symbols and an EPRE for the DMRS,
   wherein the power offset is set to 0 dB or 3 dB on the basis of the second information.

2. The method according to claim 1, wherein:
   the number of layers corresponds to more than one layer.

3. The method according to claim 1, wherein:
   the bit information is dynamically transmitted to the user equipment.

4. A wireless communication method in which a user equipment communicates with a base station apparatus, the wireless communication method comprising:
   receiving, from the base station apparatus, bit information, wherein
   the bit information indicates first information indicating one or more antenna ports and second information indicating a number of layers for downlink data symbols;
   receiving the downlink data symbols and Demodulation Reference Signal (DMRS) on the basis of a power offset between an Energy Per Resource Element (EPRE) for the downlink data symbols and an EPRE for the DMRS,
   wherein the power offset is set to 0 dB or 3 dB on the basis of the second information.

5. The method according to claim 4, wherein:
   the number of layers corresponds to more than one layer.

6. A base station apparatus which configured to communicate with a user equipment, the base station apparatus comprising:
   a transmitting unit configured to transmit, to the user equipment, bit information, wherein
   the bit information indicates first information indicating one or more antenna ports and second information indicating a number of layers for downlink data symbols; and
   a setting unit configured to set a power offset to 0 dB or 3 dB on the basis of the second information, the power offset being a power offset between an Energy Per Resource Element (EPRE) for the downlink data symbols and an EPRE for Demodulation Reference Signal (DMRS),
   the transmission unit configured to transmit the DMRS and the downlink data symbols on transmit power based on the power offset.

7. The base station apparatus according to claim 6, wherein:
   the number of layers corresponds to more than one layer.

8. The base station apparatus according to claim 6, wherein:
   the bit information is dynamically transmitted to the user equipment.

9. A user equipment which configured to communicate with a base station apparatus, the user equipment comprising:
   a receiving unit configured to receive, from the base station apparatus, bit information, wherein
   the bit information indicates first information indicating one or more antenna ports and second information indicating a number of layers for downlink data symbols; and
   a setting unit configured to set a power offset to 0 dB or 3 dB on the basis of the second information, the power offset being a power offset between an Energy Per Resource Element (EPRE) for the downlink data symbols and an EPRE for Demodulation Reference Signal (DMRS),
   wherein the reception unit is configured to receive the downlink data symbols and the DMRS on the basis of the power offset.

10. The user equipment according to claim 9, wherein:
    the number of layers corresponds to more than one layer.

11. The user equipment according to claim 9, wherein:
    the bit information is dynamically received from the base station apparatus.

12. The method according to claim 4, wherein:
    the bit information is dynamically received from the base station apparatus.

13. The method according to claim 1, the method comprising:
    setting an index to the bit information, the index is an index of a table which is comprised by the first information and the second information.

14. The method according to claim 13, the method comprising:
    configuring the index based on both a value of the first information and a value of the second information.

15. The method according to claim 4, the method comprising:
    detecting a index via the bit information, the index is a index of a table which is comprised by the first information and the second information.

16. The method according to claim 15, the method comprising:
   setting a value of the first information and a value of the second information on the basis of the index.

17. The base station apparatus according to claim 6, the base station apparatus comprising:
   a configuring unit configured to set an index to the bit information, the index is an index of a table which is comprised by the first information and the second information.

18. The base station apparatus according to claim 17, wherein:
   the configuring unit is configured to configure the index based on both a value of the first information and a value of the second information.

19. The user equipment according to claim 9, the user equipment comprising:
   a detecting unit configured to detect a index via the bit information, the index is a index of a table which is comprised by the first information and the second information.

20. The user equipment according to claim 19, wherein:
   the setting unit is configured to set a value of the first information and a value of the second information on the basis of the index.

* * * * *